(12) United States Patent
Peng et al.

(10) Patent No.: US 7,045,767 B2
(45) Date of Patent: May 16, 2006

(54) SELF-COMPENSATING FIBER OPTIC FLOW SENSOR HAVING AN END OF A FIBER OPTICS ELEMENT AND A REFLECTIVE SURFACE WITHIN A TUBE

(75) Inventors: Wei Peng, Blacksburg, VA (US); Bing Qi, Blacksburg, VA (US); Anbo Wang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 266 days.

(21) Appl. No.: 10/653,920

(22) Filed: Sep. 4, 2003

(65) Prior Publication Data

US 2004/0046110 A1    Mar. 11, 2004

Related U.S. Application Data

(60) Provisional application No. 60/407,983, filed on Sep. 5, 2002.

(51) Int. Cl.
*G02B 6/42* (2006.01)

(52) U.S. Cl. .............................. 250/227.25; 250/227.14
(58) Field of Classification Search ........... 250/227.25, 250/227.14
See application file for complete search history.

(56) References Cited

U.S. PATENT DOCUMENTS 3,915,570 A * 10/1975 Skala .......................... 356/73
5,247,490 A    9/1993 Goepel et al.
6,426,796 B1   7/2002 Pulliam et al.
6,470,758 B1 * 10/2002 Bernard et al. .......... 73/861.51

\* cited by examiner

*Primary Examiner*—Que T. Le
(74) *Attorney, Agent, or Firm*—Whitham, Curtis, Christofferson & Cook, PC

(57) ABSTRACT

A flow rate fiber optic transducer is made self-compensating for both temperature and pressure by using preferably well-matched integral Fabry-Perot sensors symmetrically located around a cantilever-like structure. Common mode rejection signal processing of the outputs allows substantially all effects of both temperature and pressure to be compensated. Additionally, the integral sensors can individually be made insensitive to temperature.

15 Claims, 2 Drawing Sheets

SELF-COMPENSATING FIBER OPTIC FLOW SENSOR HAVING AN END OF A FIBER OPTICS ELEMENT AND A REFLECTIVE SURFACE WITHIN A TUBE

CROSS-REFERENCE TO RELATED APPLICATIONS

This application claims priority of U.S. Provisional Patent Application Ser. No. 60/407,983, filed Sep. 5, 2002, entitled "Self-Compensating Fiber Optical Flow Sensor" which is hereby fully incorporated by reference. This application is also related to U.S. Pat. No. 6,426,796, to Pulliam et al. and entitled "Fiber Optic Wall Shear Stress Sensor" which is assigned to the assignee of the present invention and also fully incorporated by reference.

STATEMENT OF GOVERNMENT INTEREST

This invention was made with government support under contract Number DE-FT26-98BC15167 awarded by the U.S. Department of Energy. The Government has certain rights in the invention.

BACKGROUND OF THE INVENTION

1. Field of the Invention

The present invention generally relates to fiber optic sensors for remote telemetry and, more particularly, to self-compensated fiber optic sensors, especially for the purposes of measuring fluid flow and shear stresses resulting from fluid flow.

2. Description of the Prior Art

Fiber optic sensors have been known for a number of years and are much preferred for making remote measurements of temperature, pressure and other conditions such as strain, flow rate, shear forces and the like, particularly in harsh environments. Performing telemetry using radiant energy carried by fiber optic light guides is inherently free from electromagnetic noise and interference and has proven highly reliable. Moreover, very small, inexpensive and highly robust sensors have been developed which are easily calibrated and provide extremely high sensitivity and accuracy through use of interferometric techniques.

Many designs for fiber optic interferometric sensors are known and many variations and implementations have been developed. However, the basic arrangement of the most successful of these designs generally involve the formation of a reflective surface near the end of a fiber optic cable which is used to both supply light to the sensor from a remote location and return light to the remote location after it is passed through the sensor. The basic principle of operation of such sensors is that the end of the fiber optic cable provides a partially reflecting surface allowing some light to pass to and be reflected by a further reflective surface spaced a very short distance from the end of the fiber optic cable thus forming a gap between reflecting surfaces. The sensor is configured in such a way that the length of the gap is variable with the parameter of interest. Thus the light reflected from the respective surfaces will have two components; one delayed with respect to the other and which will form an interference pattern in which regions of reinforcement or cancellation will be observable and which will vary strongly with potentially minute changes in the gap length. Other arrangements using other phenomena such as wavelength separation are also known.

To provide for the gap length to be reliably established while allowing variation thereof with any of a plurality of parameters of interest, the sensor structure of choice generally and most basically comprises a tube with optical fibers inserted into opposite ends thereof to be aligned in close proximity while forming a gap and the tube bonded to the respective optical fibers to fix the relative positions of the optical fibers. However, the important physical feature of a fiber optic sensor of this type is the gap between reflective surfaces and the tube housing, while generally convenient, is not necessary to the basic principles of a fiber optic sensor.

An important and frequently desirable measurement for which design of sensors of any type is difficult is that of sensing flow rate or shear stresses caused by fluid flow over a surface. For example, a significant fraction of the total resistance to motion of airplanes and ships is due to surface or skin friction while the availability of skin friction transducers is limited. Further, incidental effects of temperature and pressure are also generally unavoidable (e.g. due to Bernoulli and frictional heating effects) when measuring fluid flow across a surface. It is also very difficult to apply a sensor of any type to such a measurement, especially if direct measurement of skin friction or flow rate is to be made consistent with minimal interference with the measured parameter. Whether measurement of fluid flow rate/velocity or skin friction/shear forces are made directly or indirectly, the sensor must necessarily intrude upon the interface of the surface and the fluid and can thus potentially disrupt the parameter being measured and may not be reliable except in particular flow regimes. For example, Stanton tubes, Preston tubes and surface hot wire techniques are not reliable for complex three-dimensional or otherwise irregular flows (e.g. due to irregular surfaces, injection or suction of fluids or impinging shocks and direct measurements usually involve a floating head replacing a portion of the surface over which the flows take place or extending into the flow which is difficult, if not impossible, to provide without introducing at least irregularities in the surface. In general, however, direct measurements are less intrusive upon the flow regime and are thus generally preferred.

Because of the possibility that measurement of shear force or flow rate may interfere with the fluid flow, designs for such sensors have been developed of both the nulling and non-nulling types. A nulling sensor allows for motion or deflection of the floating head of the sensor but restores the floating head to a given position; the measurement being a function of the restoration force. That is, if the floating head remains in a given position, the interference with the measured parameter will at least be essentially constant or consistent since the shape of the surface will be unchanged at any flow regime. However, such nulling measurement arrangements are complicated and expensive while compromising reliability and response time. Non-nulling arrangements are far more simple, reliable and economical but, as pointed out above, may compromise the flow regime in unpredictable ways. Both nulling and non-nulling types of sensors, regardless of the measurement hardware are often subject to errors caused by temperature and or pressure variations which are unavoidable, as also noted above, particularly if of the fiber optic type.

However, a floating head, non-nulling fiber optic sensor for flow rate and shear forces is known an disclosed in the above-incorporated U.S. Pat. 6,246,796. This sensor uses a cantilevered arm to support a tethered floating head and uses fiber optic cables to conduct light to be reflected from surfaces of the floating head or parts of the support therefor.

To provide temperature compensation, two or more optical fibers are symmetrically placed on opposing sides of the cantilever such that variations in geometry due to temperature will occur at both measurement gaps and can be approximately compensated by processing (e.g. subtracting) to remove the common mode component from both measurements. However, it is recognized in that disclosure that the floating head, even if tethered, may remain more subject to displacement from pressure than from shear forces and the sensor relies upon relatively greater stiffness along the length of the cantilever than in the direction of motion of the floating head to counteract effects of pressure. This patent also acknowledges extrinsic Fabry-Perot interferometer (EFPI) sensors using a construction including a glass tube for respectively locating the ends of partially reflecting fiber optic elements as discussed above but also notes that slight pressure sensitivity remains.

SUMMARY OF THE INVENTION

It is therefore an object of the present invention to provide a self-compensated fiber optic sensor for measurement of shear force or flow rate with high accuracy and resolution under adverse conditions of temperature and/or pressure and over large distances.

It is another object of the invention to provide a fiber optic shear force or flow rate transducer of improved robustness and reliability while providing reduced sensitivity to unwanted parameters such as temperature and pressure.

In order to accomplish these and other objects of the invention, a telemetry system and fiber optic sensor or transducer therefor is provided to measure flow rate including a single end-fixed cantilevered bar material, two sensors, preferably of the Fabry-Perot type, symmetrically located (preferably by bonding to the cantilever) and constituted by lead-in and reflecting fibers and sealed to a tube to form a gap.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
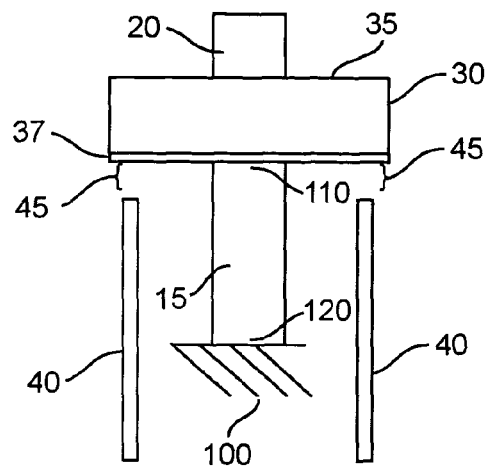
FIG. 1 is a cross-sectional schematic diagram of a flow or shear force sensor as disclosed in the above-incorporated U.S. Pat. No. 6,246,796.

Referring now to the drawings, and more particularly to FIG. 1, there is shown, in cross-sectional, schematic form, the shear force or flow rate sensor of the above-incorporated U.S. Pat. No. 6,246,796, which is acknowledged as prior art. This Figure appears as FIG. 2 of that patent and is considered representative of the principles of the various embodiments of that invention disclosed therein. Floating head 20 is supported by a cantilever 15 (having ends 110 and 120) for which a spring, a flexure or an elastic support are also considered as being suitable although the latter would not provide resistance to movement of the floating head due to pressure (positive or negative). A reflector 30 is provided having a reflective surface 37 on the underside thereof. The upper side 35 of the floating head is subjected to fluid flow.

Two fiber optic cables 40 are provided and positioned to form gaps 45. The lengths of these gaps can be monitored in several known ways including interferometric techniques discussed above. It is contemplated that shear forces will cause slight bending of the cantilever such that one gap will be increased while the other will be decreased; the difference indicating direction and velocity of the fluid flow. At the same time, changes in the gap length due to temperature will cause substantially equal changes in the gap length which can be removed from the data by suitable processing (e.g. subtraction). Thus, the sensor system of U.S. Pat. No. 6,246,796, may allow compensation for changes in temperature.

Figure 2:
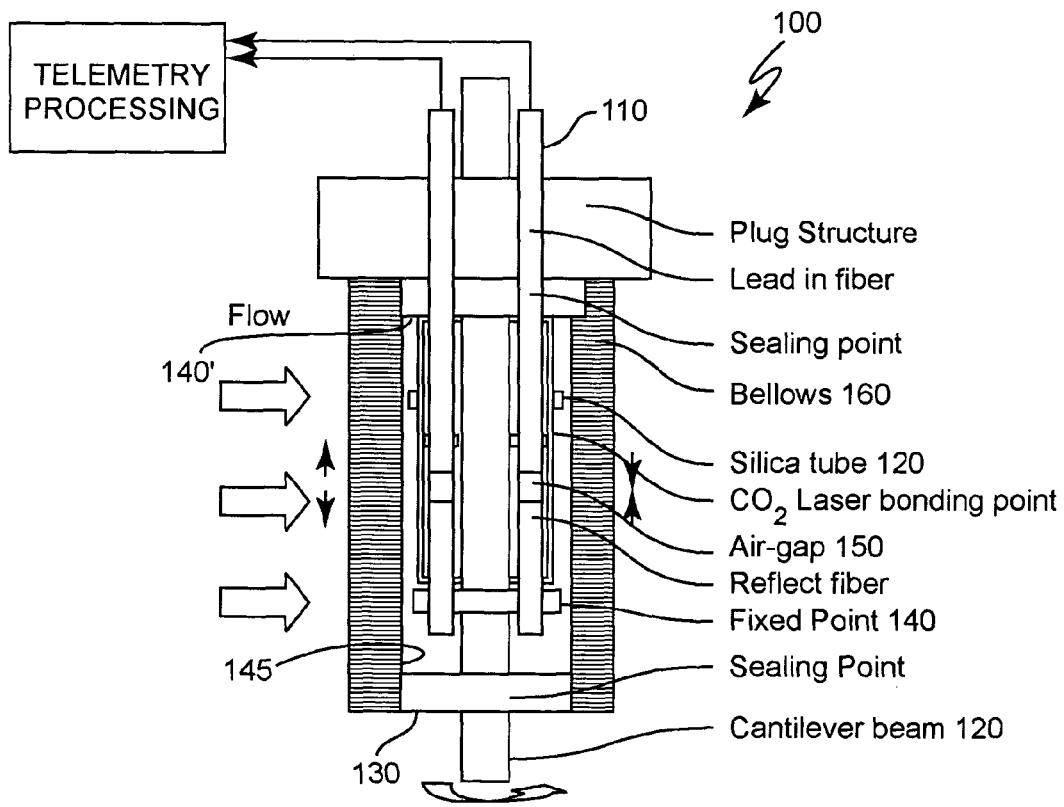
FIG. 2 is a cross-sectional schematic diagram of the temperature and pressure self-compensated shear flow or flow rate sensor in accordance with the present invention.

Referring now to FIG. 2, the sensor 100 (sometimes referred to as a transducer) in accordance with the invention will now be discussed. The principal structural difference between the invention, as illustrated in FIG. 2 and the prior art sensor of FIG. 1 is that integral sensors 110, preferably comprising a tube for positioning the reflective surfaces of (preferably single mode) optical fibers defining one or more gaps 150 (or other structure forming a reflector closely spaced from a preferably flat end of a lead-in optical fiber), are provided substantially parallel to a cantilever 120 between a reference surface 140/140' and a floating head 130 or along and between the ends of the cantilever or other structure (e.g. multiple cantilevers providing substantial parallelism between a fixed end and a floating head) having a fixed end and a displaceable end in place of the (e.g. cantilevered) fiber optic cable (40 of FIG. 1) forming an air gap with the reflector which moves with the surface subjected to fluid flow. In other words, in accordance with the invention, forces on surface 130 causing deflection of cantilever 120 are transferred to integral sensors 110 which may be of the EFPI type. Further, in a manner similar to that of FIG. 1, effects due to temperature can be compensated by common mode rejection processing as discussed above as well as developing enhancements of self-compensation by the transducer structure while effects of pressure can also be compensated by common mode rejection processing of the integral sensor outputs.

However, it has been recognized by the inventors that motions of surface 120 (and consequent changes in sensor output) due to variations in pressure can also be compensated by common mode rejection processing of the sensor output. Further, this effect can be enhanced and the pressure compensation made arbitrarily accurate in combination with self-compensation of the sensor for variations in temperature. Specifically, while it is known that a fiber optic sensor using a tube for reflective surface positioning, as in the EFPI type of sensor, can be made substantially insensitive to temperature by closely matching the coefficients of thermal expansion (CTEs) of the tube and the fiber optic elements, a similarly arbitrary degree of temperature insensitivity of a flow sensor configured as shown in FIG. 2 and including two sensors can also be made substantially temperature insensitive by closely matching the CTEs of the sensor and the cantilever structure 120. (The illustration of the sensor in accordance with the invention is inverted in orientation relative to the illustration of the sensor of FIG. 1, with the floating head at the bottom. However, the orientation of the sensor of either FIG. 1 or 2 is substantially irrelevant to its operation, although some calibration for gravity effects may be desirable.) The material of the cantilever is not critical to the practice of the invention but alloys are generally preferred, particularly since alloys can be freely chosen to provide a desired CTE over a relatively wide range. Thus, essentially no forces which are due to temperature variation affect the length of the sensor gap and the CTEs of the tube and the fiber optic elements can be arranged in combination with other geometry of the sensor such that gap variations of the respective sensors are each effectively canceled to provide substantially complete self-compensation for temperature.

To whatever degree such self-compensation for temperature may be accomplished. It should be understood that minimization of temperature sensitivity is helpful and considered advantageous but not necessary to the successful practice of the invention to provide both temperature and pressure self-compensation. In a sensor configuration as is shown in FIG. 2, both temperature and pressure will act substantially equally on both/all of sensors 110 and can thus be easily compensated by common mode rejection processing of the sensor outputs, particularly if temperature sensitivity is minimized as discussed above. This effect and the overall accuracy of the sensor in accordance with the invention in regard to flow rate and shear force measurement (as well as freedom from the production of effects which can interfere with the measurement accuracy) is significantly enhanced by the stiffness of the sensors, which are preferably closely matched in response characteristics to temperature and pressure, in accordance with the invention and can thus more substantially support a floating head structure in a substantially stationary position to avoid perturbation of the surrounding flow regime while avoiding any forces passed through the sensors from being reflected in the processed output. It should be appreciated that this quality of the flow rate/shear force sensor in accordance with the invention performs very similarly to the nulling type of sensor (in which the floating head is returned to very near its unloaded or neutral position by a feed-back arrangement but which necessarily requires some slight positional error on which to operate) while avoiding the complexity thereof.

Moreover, it is possible that in some applications, temperature and pressure will have opposite effects on the sensor output and it is possible to obtain a degree of or substantially complete self-compensation for both temperature and pressure by proper choice of CTEs of the fiber optics elements and the tube and/or the cantilever in combination with sensor geometry for any particular ranges of temperature and pressure that may be anticipated in a given application of the sensor in accordance with the invention. For example, gap shortening due to an approximate anticipated pressure could be closely balanced over an anticipated temperature range by choice of tube, fiber optic element and cantilever material CTEs.

As perfecting features of the invention in its presently preferred form, a bellows 160 is provided which is preferably sealed to the fixed plate 140' and floating head 130 and highly flexible at least in a direction of measured flow (e.g. such as may be achieved with a spring 145 defining the bellows shape) but which can have substantial stiffness in compression to provide some reduction in the ambient pressure which reaches the sensor tube. Whether or not any such effect is developed in a given sensor, the bellows 160 serves as a protective housing and prevents mechanical forces from being applied by the flow to the fiber optic sensors or cantilever other than from the floating head as well as preventing contamination, damage and the like. This provision assures that the cantilever receives only a concentrated load from the floating head and not a distributed load. Hence the shape of the deflected cantilever is predictable and repeatable over a variety of flow conditions. In this regard, coupling of forces from the cantilever to the sensors can also be recessed from the floating head 130 by providing a plate 140 at a fixed point on the cantilever at a point separated from the floating head.

As a further perfecting feature, stiffness of the sensor can be enhanced with some mechanical protection provided to the sensors by bonding the sensors to the cantilever along their length in addition to attachment to floating head 130 or the plate at fixed point 140. Such a structure effectively increases the cross-section of the cantilever structure which increases stiffness and effectively limits the measurement to the alteration of shape of the cantilever at the portion corresponding to the gap (over which while high senitivity will be maintained to length change, the change in length attributable to shape variation over such a short length is negilgible.

Figure 3:
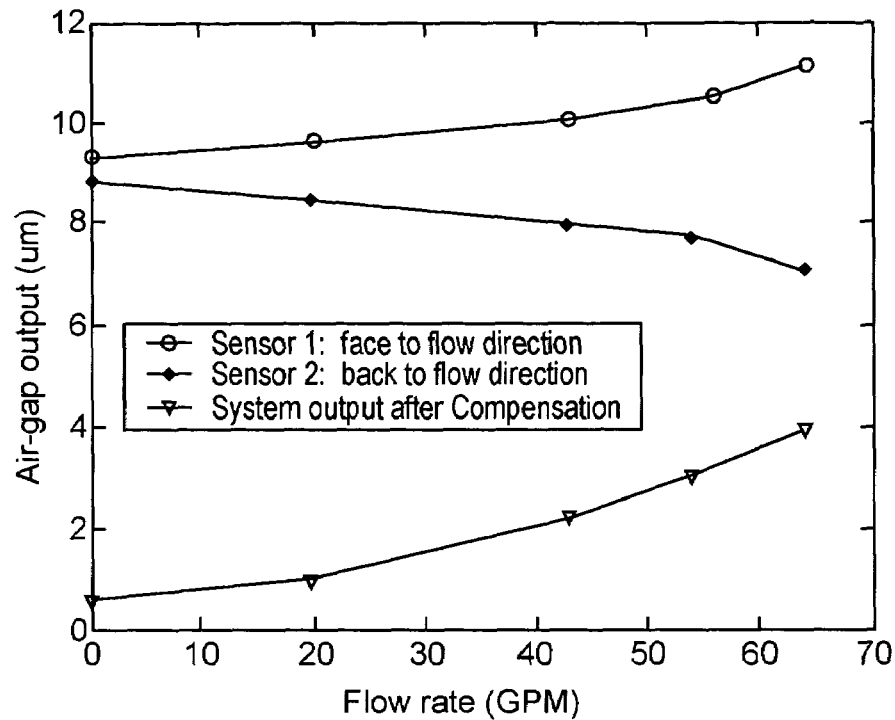
FIG. 3 is a graph comparing performance of the sensor with and without temperature compensation.

FIG. 3 graphically illustrates the efficacy of the invention in regard to temperature and pressure compensation. The upper two curves represent the upstream and downstream sensor outputs, respectively. These individual outputs are strongly biased by a combination of temperature and/or pressure effects and the upstream sensor output is clearly subject to significant variation possibly due to some effects other than temperature and pressure. However, these curves are also highly symmetrical and, after common mode rejection processing, a highly linear curve of differential output versus flow rate clearly results.

It should be noted that the test data of FIG. 3 was obtained without specially designed matching of CTEs as discussed above. It is expected that such results would be substantially improved by substantially full temperature self-compensation and/or with or without partial pressure self-compensation.

Figure 4:
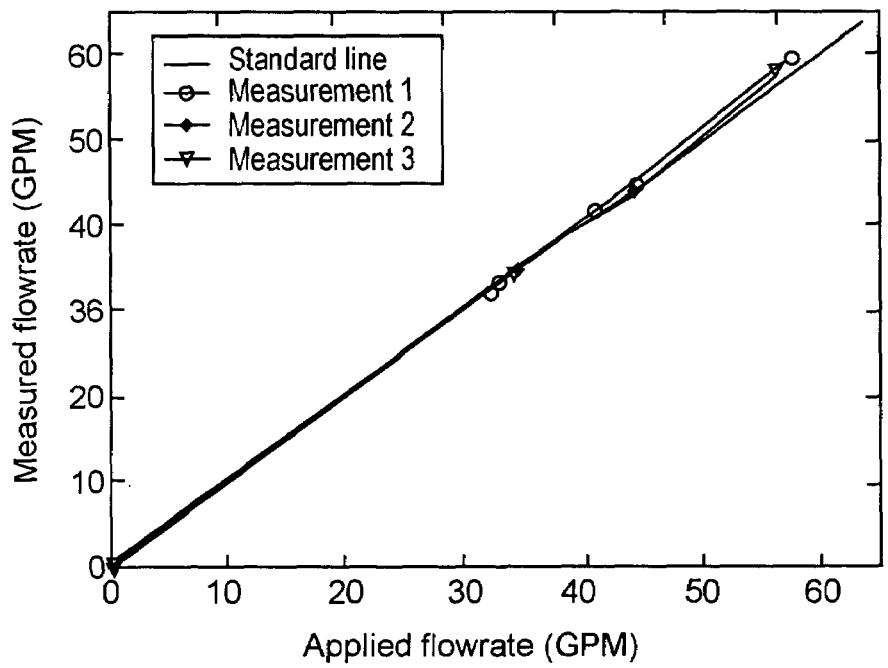
FIG. 4 is a graph illustrating the high degree of temperature and pressure self-compensation achieved by the invention.

FIG. 4 shows experimental test data obtained using a flow testing loop. As illustrated, very high accuracy of flow rate measurement is maintained over a very wide range of flow rates while the measurements remain highly consistent and repeatable over a temperature range of 80°–98° F. and over a pressure range of 6 to 99 Psi. It can also be appreciated that, due to the high accuracy, linearity and consistency over a wide ranges of flow rate, temperature and pressure, that the very slight variation could be corrected by calibration or possibly improved or adjusted thermal correction or both.

In view of the foregoing, it is seen that the invention provides full or partial self-compensation for temperature and/or pressure and system compensation for any residual effects of both temperature and pressure while providing a sensor or convenient applicability to sensitive and highly repeatable flow rate and/or shear force measurements. The sensor in accordance with the invention is of increased robustness and can support a floating head with potentially reduced perturbation of the surrounding flow regime.

While the invention has been described in terms of a single preferred embodiment, those skilled in the art will recognize that the invention can be practiced with modification within the spirit and scope of the appended claims.

What is claimed is:

1. A fiber optic transducer for measuring shear force or flow rate comprising
 a floating head,
 a reference surface,
 a cantilever means extending between said reference surface and said floating head, and a plurality of integral fiber optic sensors arranged to sense relative motion between said reference surface and said floating head, each said integral fiber optic sensor comprising
a tube,
a fiber optic element having an end within said tube, and
a reflective surface positioned by said tube at a location spaced from said end of said fiber optic element by said tube.

2. The transducer as recited in claim 1 wherein said plurality of integral fiber optic sensors are symmetrically arranged around said cantilever.

3. The transducer as recited in claim 2 wherein said plurality of integral fiber optic sensors comprise two integral fiber optic sensors.

4. The transducer as recited in claim 1 wherein said plurality of integral fiber optic sensors comprise two integral fiber optic sensors.

5. The transducer as recited in claim 1 wherein some of said plurality of integral fiber optic sensors are bonded to said cantilever means.

6. The transducer as recited in claim 1 wherein said reflective surface is formed by an end of an optical fiber.

7. The transducer as recited in claim 1 wherein said end of said optical fiber is substantially flat.

8. The transducer as recited in claim 1, further including a housing surrounding said cantilever means and said plurality of integral sensors.

9. The transducer as recited in claim 8, wherein said housing includes a bellows sealed to said floating head.

10. The transducer as recited in claim 9 wherein said bellows further includes a spring.

11. The transducer as recited in claim 1 wherein said cantilever means is formed of an alloy.

12. The transducer as recited in claim 1 wherein at least two of said integral sensors are matched for responses to temperature and pressure.

13. The transducer as recited in claim 1 wherein at least two of said plurality of integral sensors are substantially insensitive to temperature variation.

14. The transducer as recited in claim 1 wherein an integral sensor of said plurality of integral sensors includes a plurality of gaps.

15. A flow rate or shear force telemetry system including
a fiber optic transducer for measuring shear force or flow rate comprising
a floating head,
a reference surface,
a cantilever means extending between said reference surface and said floating head, and
a plurality of integral fiber optic sensors arranged to sense relative motion between said reference surface and said floating head, each said integral fiber optic sensor comprising
a tube,
a fiber optic element having an end within said tube, and
a reflective surface positioned by said tube at a location spaced from said end of said fiber optic element by said tube, and signal processing means including common mode signal rejection processing.

* * * * *